US008528117B2

(12) United States Patent
Asiaghi

(10) Patent No.: US 8,528,117 B2
(45) Date of Patent: Sep. 10, 2013

(54) GLOVES FOR TOUCHSCREEN USE

(75) Inventor: Carol Ann Asiaghi, Brooklyn, NY (US)

(73) Assignee: The Echo Design Group, Inc., New York, NY (US)

( * ) Notice: Subject to any disclaimer, the term of this patent is extended or adjusted under 35 U.S.C. 154(b) by 181 days.

(21) Appl. No.: 12/770,669

(22) Filed: Apr. 29, 2010

(65) Prior Publication Data

US 2011/0265245 A1 Nov. 3, 2011

(51) Int. Cl.
A41D 19/00 (2006.01)

(52) U.S. Cl.
USPC .................................................. 2/167; 2/159

(58) Field of Classification Search
USPC .................. 2/161.8, 167, 160, 163; 442/318; 66/65
See application file for complete search history.

(56) References Cited

U.S. PATENT DOCUMENTS

| 613,847 | A | | 11/1898 | Rue | |
|---|---|---|---|---|---|
| 996,015 | A | * | 6/1911 | Gilbert et al. | 66/65 |
| 1,890,055 | A | * | 12/1932 | Grumbach | 66/172 R |
| D97,257 | S | | 10/1935 | Breath | |
| 2,117,122 | A | * | 5/1938 | Usher | 66/65 |
| 2,259,381 | A | * | 10/1941 | Imbriani | 66/65 |
| 2,288,840 | A | | 7/1942 | Raiche | |
| D149,783 | S | | 5/1948 | Woller-Duff | |
| D168,365 | S | | 12/1952 | Merkel | |
| 2,722,706 | A | | 11/1955 | Chopp | |
| 3,096,523 | A | | 7/1963 | Bruchas | |
| 3,341,861 | A | | 9/1967 | Robbins | |
| 5,125,115 | A | | 6/1992 | Lincoln | |
| D351,933 | S | | 11/1994 | Stoneman | |
| 5,435,012 | A | | 7/1995 | Lincoln | |
| 5,581,809 | A | * | 12/1996 | Mah | 2/20 |
| 5,781,931 | A | | 7/1998 | Lee | |
| 5,790,980 | A | * | 8/1998 | Yewer, Jr. | 2/20 |
| D403,138 | S | | 12/1998 | Wilmot | |
| 6,041,438 | A | | 3/2000 | Kirkwood | |
| 6,155,084 | A | * | 12/2000 | Andrews et al. | 66/174 |
| D446,368 | S | | 8/2001 | Pizarro | |
| 6,457,182 | B1 | | 10/2002 | Szczesuil | |

(Continued)

FOREIGN PATENT DOCUMENTS

| JP | 7-31087 U | 6/1995 |
|---|---|---|
| JP | 10-331010 A | 12/1998 |

(Continued)

OTHER PUBLICATIONS

Jan152009WSJ "Keeping Your Hands Warm and Texting, Too" by Willa Plank, published Jan. 15, 2009, http://online.wsj.com/article/SB123198733366084499.html.*

(Continued)

Primary Examiner — Khoa Huynh
Assistant Examiner — Anna Kinsaul
(74) Attorney, Agent, or Firm — Wiggin and Dana LLP; Gregory S. Rosenblatt

(57) ABSTRACT

A glove that enables the wearer to interact with a capacitive touchscreen without removing the glove has a first portion formed from a non-conductive knitted material and a second portion formed from an electrically conductive yarn. Exemplary is the finger tip portions of the thumb and index finger being formed from the electrically conductive yarn and the remainder of the finger tips being formed from the non conductive yarn. The second, conductive, portion may include a non-conductive yarn with an electrically conductive fiber distributed uniformly therethrough.

14 Claims, 3 Drawing Sheets

(56) References Cited

U.S. PATENT DOCUMENTS

| | | | |
|---|---|---|---|
| D468,074 S | 1/2003 | Votel | |
| 6,513,998 B1 | 2/2003 | Barry | |
| 6,557,178 B1 | 5/2003 | Hoover | |
| 6,687,911 B2 | 2/2004 | Fitz | |
| D499,856 S | 12/2004 | Kleinert | |
| 7,159,246 B2 | 1/2007 | Tippey | |
| D544,665 S | 6/2007 | Keene | |
| 7,365,031 B2 * | 4/2008 | Swallow et al. | 442/181 |
| D583,104 S | 12/2008 | Stewart | |
| D589,666 S | 3/2009 | Crater | |
| D593,720 S | 6/2009 | Nourian | |
| D595,459 S | 6/2009 | Atherton | |
| D595,929 S | 7/2009 | Brown | |
| D617,529 S | 6/2010 | Bengyak | |
| D621,553 S | 8/2010 | Fitzgerald et al. | |
| 7,874,021 B2 | 1/2011 | Sunder et al. | |
| 2005/0151722 A1 | 7/2005 | Meteyer | |
| 2005/0231471 A1 | 10/2005 | Mallard et al. | |
| 2006/0183989 A1 * | 8/2006 | Healy | 600/372 |
| 2007/0059524 A1 * | 3/2007 | Voigt | 428/375 |
| 2007/0277288 A1 | 12/2007 | Sing et al. | |
| 2009/0183297 A1 * | 7/2009 | Drosihn | 2/167 |
| 2010/0090966 A1 * | 4/2010 | Gregorio | 345/173 |
| 2011/0047672 A1 * | 3/2011 | Hatfield | 2/163 |

FOREIGN PATENT DOCUMENTS

| | | |
|---|---|---|
| JP | D1116482 S | 7/2001 |
| JP | 2008-081896 A | 4/2008 |
| JP | 3160211 U | 5/2010 |

OTHER PUBLICATIONS

May92009Touchees "Touchees Gloves: iPhone Accessory Review" by Cyprian, published May 9, 2009, http://www.iphoneworld.ca/iphone-reviews/2009/05/09/touchees-gloves-iphone-accessory-review/.*

June152009Dots "DOTS gloves: Touchscreen friendly anti-cold gloves," published Jun. 15, 2009, http://www.gizmodiva.com/fashion/dots_gloves_touchscreen_friendly_anticold_gloves.php.*

Sept272009Dots "Dots Gloves Releases New Line of iPhone Gloves" published Sep. 27, 2009, http://www.prweb.com/releases/2009/09/prweb2949304.htm.*

Oct262009Dots "Dial Up Some Dots Gloves" by admin, published Oct. 26, 2009, http://www.yobeat.com/2009/10/26/dial-up-some-dots-gloves/.*

Oct282009Dots "Dots Gloves D105+ D110 Gloves for iPhone + iPod touch" by Jeremy Horwitz, published Oct. 28, 2009, http://www.ilounge.com/index.php/reviews/entry/dots-gloves-d105-d110-gloves-for-iphone-ipod-touch/.*

Nov192009Dots "Dots Gloves with inTouch fingertips for iPhone/iPod Touch" by Shikha Patial, published Nov. 19, 2009, http://www.gizmowatch.com/entry/dots-gloves-with-intouch-fingertips-for-iphoneipod-touch/.*

(Gauge) "Thinking beyond the pattern," by Jenna Wilson, Copyright 2005, published on Knitty, "http://www.knitty.com/ISSUEsummer05/FEATsum05TBP.html" 6 pages.*

Sherwood, James; "Gloves for (cold) gadget lovers," downloaded from http://www.reghardware.com/2008/12/10/tavo_gloves/print.html; Dec. 10, 2008.

Nguyen, Charles; "Apple's Touchscreen Gloves," downloaded from http://pocketnow.com/hardware-1/apples-touchscreen-gloves; Jan. 2, 2009.

Wilson, Mark; "iPhone Glove Battlemodo," downloaded from http://gizmodo.com/5156625/iphone-glove-battlemodo; Feb. 19, 2009.

Chip Chick in Fashion; "Echo Gloves Offer Affordable & Colorful Touchscreen Enabled Gloves," downloaded from http://www.chipchick.com/2009/11/echo-gloves.html; Nov. 2009.

Karthik; "Best iPhone Gloves for Winter," downloaded from http://topiphoneresource.info/best-iphone-gloves/; Original posting Dec. 18, 2009.

JP2010-025973; Translation of Official Action by the Japanese Patent Office; Mar. 11, 2011.

Japanese Design Appeal No. 2102-5513, Translation of the Appeal Examiners' Judgment of Decision; Feb. 13, 2013.

* cited by examiner

US 8,528,117 B2

GLOVES FOR TOUCHSCREEN USE

FIELD OF THE INVENTION

This invention relates to gloves suitable for use in inclement and/or cold weather that also have conductive material at particular portions to facilitate using a touchscreen.

BACKGROUND OF THE INVENTION

A touchscreen is an electronic visual output display device that can detect the presence and location of a touch within the display area. The term "touchscreen" generally refers to a person touching or contacting the display of a device using a finger or hand. Some touchscreens can also sense other passive objects, such as a pen. A resistive touchscreen has two or more layers separated by a gap or other insulation, and pressing on the screen brings the two layers into contact or sufficiently close that the gap/insulative resistance is reduced to a point that can be sensed, thereby indicating where the user pressed the screen. These types of screens can be used with passive objects. Other screens use ultrasonic surface acoustic waves (SAWs), and interrupting the SAW with a finger or devices indicates where on the screen the user has pressed.

While there are other touchscreen technologies, one of the more common types of touchscreens uses capacitance. Because the human body can act as a conductor, physically touching such a screen with a conductive object, such as a human finger, changes the local capacitance. Such a touchscreen can be formed by a grid pattern of electrodes which, when energized, forms a grid pattern of capacitors, and reading all of the capacitors identifies where on the screen the capacitance has been effected, and thus where the display has been pressed. In another conventional construction, a layer can be energized and capacitance determined with reference to fixed references points, such as the four corners of a rectilinear display, whereby the point of touching is determined indirectly by measuring the (relative) capacitances from the various fixed points (such as at the corners).

At present, so-called "touch gloves" are gloves having a conductive portion affixed to a portion of the glove. For example, a patch of conductive material is adhered or sewn to a fingertip portion of the glove to allow the user to interact with a capacitive touchscreen.

SUMMARY OF THE INVENTION

The present invention provides a glove typically used for inclement weather, the glove having an outer surface and an inner surface defined by a first, non-conductive, woven or knitted material, and one or more predetermined locations having a pattern oversewn into the glove with a continuous conductive thread penetrating both the outer and the inner surfaces, effective to be electrically conductive between the outer and inner surfaces.

This invention also provides a glove comprising of a first, non-conductive knitted material defining an inner surface and an outer surface, and a second, conductive yarn continuing the knitted material at one or more finger tip portions of the glove effective to be electrically conductive between the outer and inner surfaces at the finger tips. Preferably, the glove consists essentially of such a knitted glove and optionally a pad sewn or adhered to a surface of the glove to be used as the palmar surface.

DETAILED DESCRIPTION OF SPECIFIC EMBODIMENTS

Figure 1:
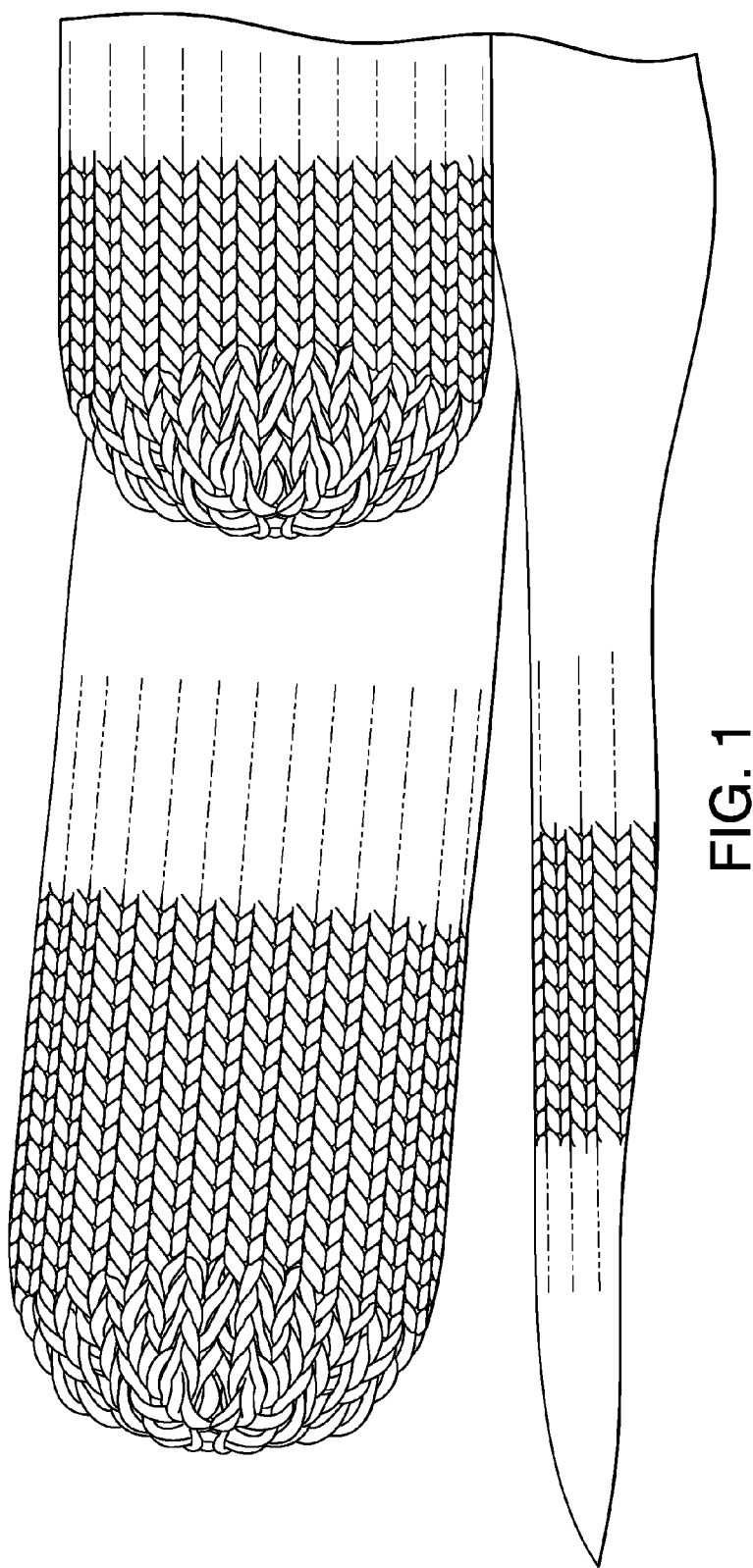
FIG. 1 is a close-up of glove fingertip made with conductive yarn.

The manufacture of gloves is well known. Gloves can be made by providing hand-shaped patterns of material, such as a woven, knitted, felted, or spun-bonded material, and attaching mirror image patterns together, typically by bonding (thermally or adhesively) or by sewing at or near the edges of the patterns. Alternatively, a glove can be knitted, and various machines are commercially available for knitting gloves. Preferably for this invention, the material used in making the glove is one desirable for making a glove suitable for use in inclement weather, such as cold, wet, or both.

In this invention, one or more particular portions of the glove, such as the tip of the index finger and thumb, are oversewn with a conductive thread. Various conductive threads are available commercially or are easily fabricated. A single metal wire can be used, such as copper (or an alloy thereof), gold, or silver, but such materials are relatively expensive and can abrade the surface of the touchscreen. A conventional thread can be painted with a conductive material, such as conductive silver paint, although sewing or knitting such can be problematic because of reduced flexibility of the fiber upon curing of the paint. Preferred is a conductive fiber or thread, such as a silver-plated nylon (for example, as commercially available from Less EMF, Inc., Albany, N.Y., as a 66 yarn 22+3ply 110 PET having a resistance of <1000 $\Omega/10$ cm). A conductive fiber or thread can be spun into a yarn suitable for use in a conventional knitting machine. The bulk of the glove is made of any yarn conventionally used or desired to be used that can be knitted into a glove. Such materials include wools, acrylics and modacrylics, cotton, cellulosics (including Rayon, Modal, and the like), nylon, aramids, elastane (Spandex, LYCRA, a registered trademark of Invista North America S.A.R.L. of Wichita, Kans.), and combinations thereof, including microfibers. A suitable yarn is 117/17 2-ply (50:50 acrylic:Modal). The bulk yarn and the conductive yarn are preferably the same gauge.

Oversewing a conventional glove with a conductive thread is preferable to using an adhered or sewn patch. Adhesives are not typically both flexible and long lasting, and are typically not conductive, so only a portion of the patch will be adhered to the glove to leave the remainder free for contact with the glove and the users finger. Similarly, thread used to sew a patch will form a surface lying above (outermost from) the patch and will be subject to additional wear, so the sewing attachment of the patch may likely not last as long as the glove material as a whole.

The oversewn thread of this invention has a number of advantages over the prior art. Oversewing a pattern uses less conductive thread than making a patch of the same thread. This reduces costs because the conductive fiber is significantly more expensive than the material used for the bulk of the glove. Oversewing essentially makes the oversewn thread a part of the glove, especially if the oversewn pattern is not as dense as the underlying glove pattern. Thus, the oversewn thread is expected to wear just as the bulk material would wear, and less so as the oversewn pattern is made more dense (i.e., more like a patch with threads closer together). By penetrating both the inner and outer surface of the glove, less thread is needed to electrically couple the touchscreen to the user's finger. Thus, while some may see the oversewn areas as artistic, others may not, and the present invention allows less thread to be used to achieve good touch activity of the device without an obtrusive pattern appearing on the glove by using a minimal amount of conductive thread.

In another embodiment, the conductive fiber is embedded in the bulk material from which the glove is made. It is known in the knitting art to feed dual yarns to a knitting machine such that they are treated as a single yarn in the knitting process, the use of multiple "ends" that are co-knit.

Another embodiment of this invention is using a hand flat machine (known as a "fingering machine" in the knitting art). In this embodiment, a first yarn is switched out and a second yarn is switched in to make the tip portions of the glove fingers. FIG. 1 shows a close-up of a glove (index finger and thumb), and FIG. 2 a palmer view, where the bulk of the glove 101 was made conventionally and two finger tips 103 were made using a hand flat machine with conductive yarn switched in for the bulk yarn. The first yarn can be of one or more colors, including different yarns that are switched in and out to create a pattern, and may comprise yarns of different compositions (for example, a modacrylic to start at the wrist and then a mixed modacrylic and cellulosic can be "striped in" for the remainder of the glove up to the fingertips, where the conductive yarns is striped in at the fingering machine). The fingertip can be made using a conductive yarn or a co-knit yarn having one end being a conductive yarn. Similarly, multiple threads, including a conductive thread can be plied into a yarn, and that yarn used for the conductive fingertip knitting.

Figure 3:
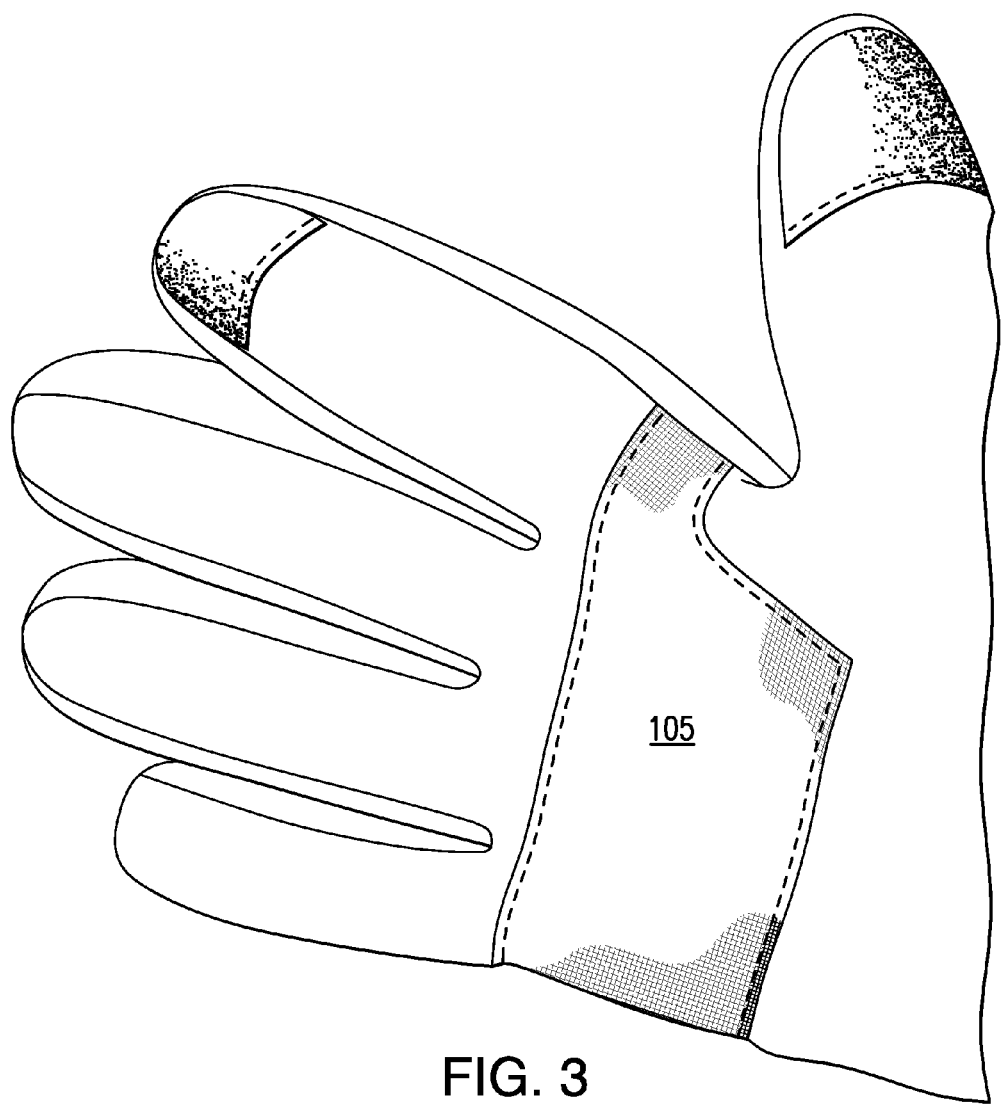
FIG. 3 is a perspective view of a glove having a pad.

In yet another embodiment, a pad 105, as seen in FIG. 3, can be sewn onto the palmar portion of the glove. Such a pad can be a fabric, natural or synthetic, or leather, preferably about as thick as the glove (i.e., the thickness between inside and outside). Although shown on only a portion of the palmar surface, the pad may extend along any portion of the palmar surface, including or excluding, as desired, one or more fingers. The pad can be adhered or sewn onto the palmar portion of the glove.

Figure 2:
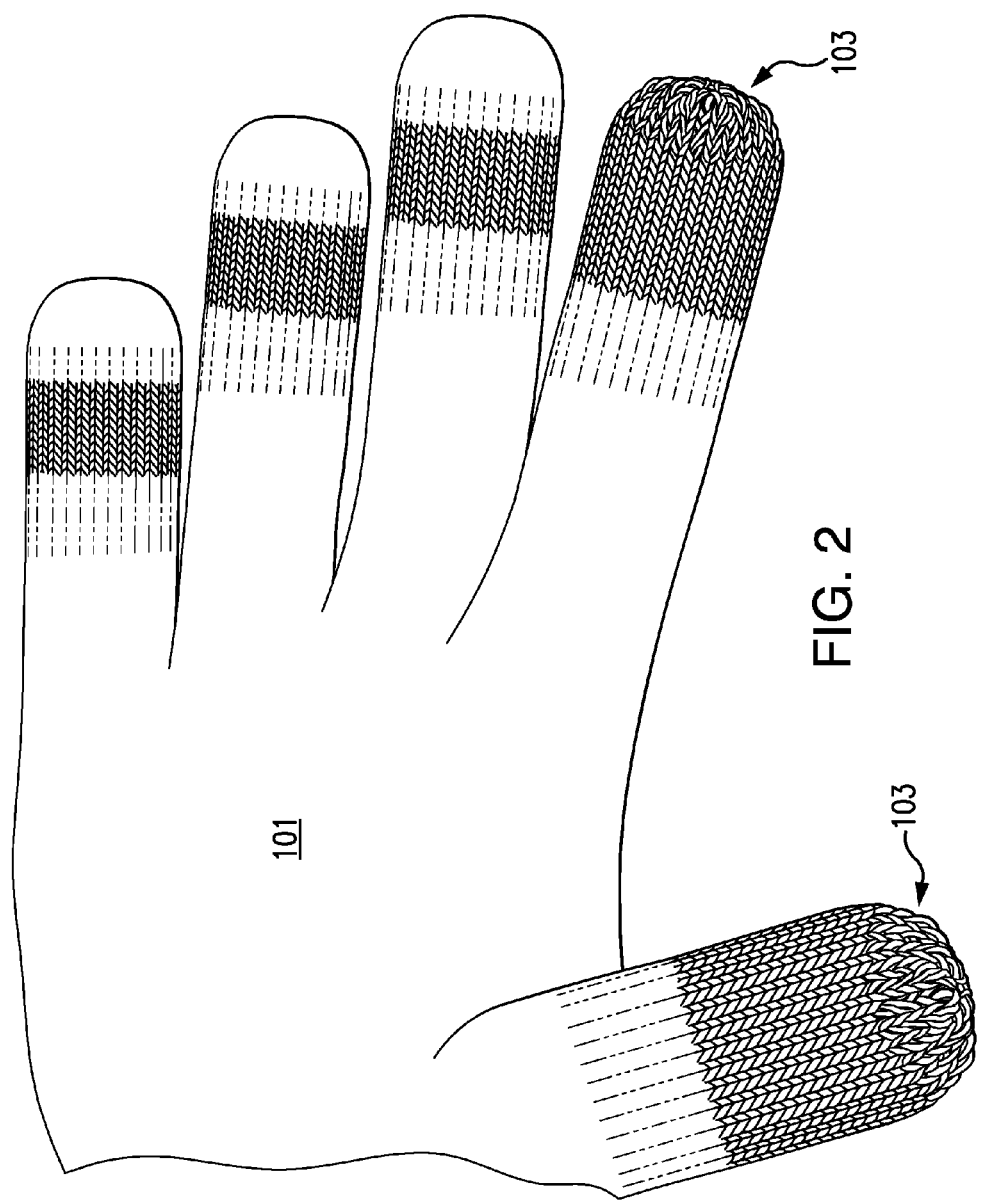
FIG. 2 is a palmar view of the glove shown in close-up in FIG. 1.

The gloves shown in FIGS. 1 and 2 were tested against gloves having conductive patches sewn onto the finger tips, where the bulk yarn was the same for both gloves. Gloves with a patch had resistances measured from the inside to the outside of the glove, across the patch, from 0.3Ω to 0.6Ω or more. Gloves made with conductive yarn consistently had resistances of 0.2Ω. Considering that touchscreens are used in the open, outdoors, and are subject to dirt and smudging (schmutz), the reduced resistance achieved by using a conductive yarn improves the performance of the gloves.

The foregoing description is meant to be illustrative and not limiting. Various changes, modifications, and additions may become apparent to the skilled artisan upon a perusal of this specification, and such are meant to be within the scope and spirit of the invention as defined by the claims. In the claims, the phrase "consisting essentially of" is intended to exclude additional glove layers, such as found in lined gloves, other than a pad on the palmar surface as described above.

What is claimed is:

1. A glove consisting essentially of:
    a first, non-conductive, knitted material defining an inner surface and an outer surface forming a bulk of the glove;
    a second, conductive, knitted material continuing from the first knitted material at finger tip portions of a thumb and an index finger of the glove, wherein said second knitted material includes a conductive fiber, said second knitted material being electrically conductive between the outer and inner surfaces at the thumb and index finger; and
    said finger tip portions of said thumb and said index finger oversewn with a conductive thread.

2. The glove of claim 1, wherein the conductive thread includes silver.

3. The glove of claim 1, further comprising a pad adhered or sewn to a palmar surface of the glove.

4. A glove consisting essentially of:
    a first, non-conductive, knitted material defining an inner surface and an outer surface forming a bulk of the glove;
    a second, conductive, knitted material continuing from the first knitted material at finger tip portions of a thumb and an index finger of the glove, wherein said first knitted material and said second knitted material are a same gauge and said second knitted material includes a conductive fiber, said second knitted material being electrically conductive between the outer and inner surfaces at the thumb and index finger; and
    said finger tip portions of said thumb and said index finger oversewn with a conductive thread.

5. The glove of claim 4 wherein said second knitted material includes a non-conductive bulk yarn with said conductive fiber embedded therethrough.

6. The glove of claim 5 wherein said conductive fiber is a silver-plated nylon.

7. The glove of claim 6 wherein said finger tip portions of said index finger and of said thumb have a resistance of 0.2 ohm.

8. The glove of claim 5 wherein said conductive knitted material is switched in and said non-conductive knitted material is switched out in a continuous knitting process.

9. The glove of claim 8 wherein conductive knitted material portions of said glove and non-conductive knitted material portions of said glove have a same stitch pattern.

10. The glove of claim 8 wherein an interface between conductive knitted material portions of said glove and non-conductive knitted material portions of said glove has a saw-tooth configuration.

11. A glove designed for use with a touchscreen that detects changes in local capacitance, consisting essentially of:
    a first, non-conductive, knitted material defining an inner surface and an outer surface forming a bulk of the glove;
    a second, conductive knitted material continuing from the first knitted material at finger tip portions of a thumb and an index finger of the glove, wherein said second knitted material includes a first conductive fiber, said second knitted material being electrically conductive between the outer and inner surfaces at the thumb and index finger; and
    said finger tip portions of said thumb and said index finger are oversewn with a conductive thread that provides a reduced resistance through said finger tip portions.

12. The glove of claim 11 wherein said conductive knitted material includes a non-conductive bulk yarn with said conductive fiber embedded therethrough.

13. The glove of claim 12 wherein said conductive fiber is a silver-plated nylon.

14. The glove of claim 13 wherein said finger tip portions of said index finger and of said thumb have a resistance of 0.2 ohm.

* * * * *